US009143323B2

(12) United States Patent  
Brown et al.

(10) Patent No.: US 9,143,323 B2
(45) Date of Patent: Sep. 22, 2015

(54) SECURING A LINK BETWEEN TWO DEVICES

(75) Inventors: Michael K. Brown, Kitchener (CA); Herb Little, Waterloo (CA); Michael S. Brown, Waterloo (CA); Neil Adams, Waterloo (CA); Michael McCallum, Kitchener (CA); Dinah Davis, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 3099 days.

(21) Appl. No.: 11/097,144

(22) Filed: Apr. 4, 2005

(65) Prior Publication Data
US 2006/0224892 A1 Oct. 5, 2006

(51) Int. Cl.
H04L 9/08 (2006.01)

(52) U.S. Cl.
CPC ........... H04L 9/0844 (2013.01); *H04L 2209/80* (2013.01)

(58) Field of Classification Search
CPC .................. H04L 9/0844; H04L 2209/80
USPC .......... 382/125, 277; 713/155, 168, 172, 178, 713/171; 380/202, 262, 283, 44, 277; 455/436; 235/382; 707/3
See application file for complete search history.

(56) References Cited

U.S. PATENT DOCUMENTS

| | | | |
|---|---|---|---|
| 5,455,862 A * | 10/1995 | Hoskinson | 380/262 |
| 6,002,787 A * | 12/1999 | Takhar et al. | 382/125 |
| 6,226,383 B1 | 5/2001 | Jablon | |
| 6,370,247 B1 | 4/2002 | Takaragi | |
| 6,507,907 B1 | 1/2003 | Takahashi | |
| 6,535,607 B1 | 3/2003 | Chandersekaran | |
| 6,711,264 B1 * | 3/2004 | Matsumoto et al. | 380/283 |
| 6,735,313 B1 | 5/2004 | Bleichenbacher | |
| 6,792,533 B2 | 9/2004 | Jablon | |
| 6,870,849 B1 * | 3/2005 | Callon et al. | 370/395.32 |
| 6,978,021 B1 * | 12/2005 | Chojnacki | 380/202 |
| 7,035,639 B2 * | 4/2006 | Obata et al. | 455/436 |
| 7,181,624 B2 * | 2/2007 | Asano et al. | 713/178 |
| 7,387,240 B2 * | 6/2008 | Ziegler | 235/382 |
| 8,108,678 B1 | 1/2012 | Boyen | |
| 2002/0025045 A1 | 2/2002 | Raike | |
| 2002/0076054 A1 * | 6/2002 | Fukutomi et al. | 380/277 |
| 2002/0199102 A1 | 12/2002 | Carman | |
| 2003/0041244 A1 * | 2/2003 | Buttyan et al. | 713/172 |
| 2003/0183691 A1 | 10/2003 | Lahteenmaki et al. | |
| 2004/0003234 A1 * | 1/2004 | Reinold et al. | 713/155 |

(Continued)

FOREIGN PATENT DOCUMENTS

WO WO-0002358 A 1/2000

OTHER PUBLICATIONS

Ziade, Francois, First Office Action for CA 2,539,658, Jan. 21, 2009.

(Continued)

*Primary Examiner* — Monjour Rahim
(74) *Attorney, Agent, or Firm* — Integral Intellectual Property Inc.; Miriam Paton; Amy Scouten

(57) ABSTRACT

A cryptographic key is used to secure a communication link between a first device and a second device. Generating the cryptographic key is accomplished by a) generating a first cryptographic key, b) generating a second cryptographic key, c) applying a hash function to packets transmitted over the communication link to create a hash result, and d) applying the hash function to the first cryptographic key, the second cryptographic key and the hash result.

12 Claims, 6 Drawing Sheets

(56) References Cited

U.S. PATENT DOCUMENTS

| | | |
|---|---|---|
| 2004/0165726 A1 | 8/2004 | Yamamichi |
| 2004/0184606 A1* | 9/2004 | Rose ............................... 380/44 |
| 2005/0050318 A1* | 3/2005 | Alone et al. .................. 713/155 |
| 2005/0138355 A1* | 6/2005 | Chen et al. ................... 713/155 |
| 2005/0171937 A1* | 8/2005 | Hughes et al. .................... 707/3 |
| 2006/0179305 A1* | 8/2006 | Zhang ........................... 713/168 |
| 2006/0236117 A1 | 10/2006 | Lazaridis et al. |
| 2007/0266247 A1 | 11/2007 | Kirkup et al. |

OTHER PUBLICATIONS

Cretaine, P , Exam Report for EP 05102639.1, Apr. 10, 2006.
Cretaine, P , "EESR", Extended European Search Report for EP 05102639.1, Jul. 18, 2005.
Yao, Yaqian, Third Office Action for CN 200610074067.5, Apr. 23, 2010.
Schwartz, Notice of Allowance for U.S. Appl No. 14/093,253, Feb. 27, 2015.

* cited by examiner

SECURING A LINK BETWEEN TWO DEVICES

BACKGROUND OF THE INVENTION

In general, wireless communication is insecure and vulnerable to attacks. Various techniques may be employed to secure a wireless communication link or to make it less vulnerable to attacks. For example, cryptographic techniques may be employed to secure a wireless communication link. In symmetric-key systems (also known as "secret-key systems"), a single, common cryptographic key is stored by two communication devices. In public-key systems (also known as "public-private pair systems"), each communication device stores its own private key and freely distributes its own public key.

Various security concerns exist with the use of cryptographic techniques. For example, secrets need to be shared between the two communication devices in a secure and authenticated manner. Especially in the case of mobile devices, it may be desirable to have only those two devices know the secret and not require the intervention/involvement of an Information Technology (IT) administrator. Also, it may be desirable to verify that the devices share a secret without exposing that secret to others, and to use the secret to generate a key to secure a communication link between the devices.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
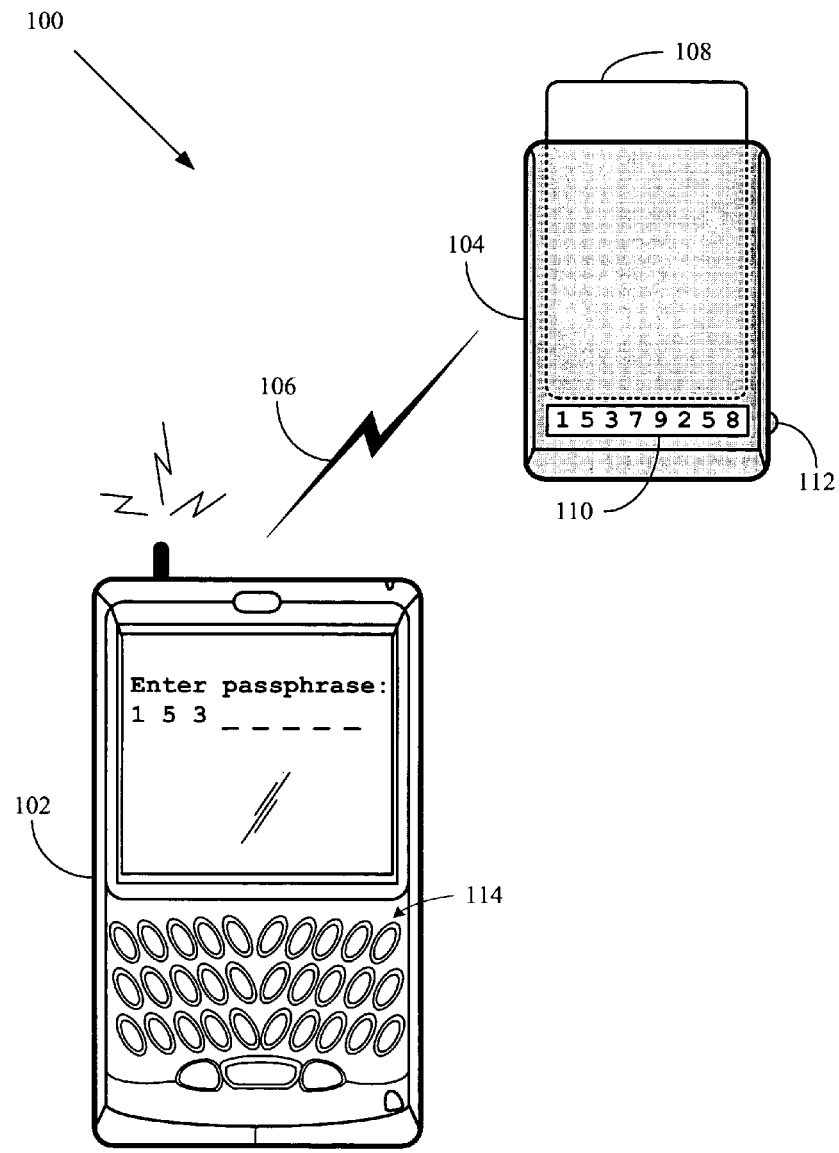
FIG. 1 is a schematic diagram of an exemplary system.

Reference is made to FIG. 1, which is a schematic diagram of an exemplary system, according to some embodiments of the invention. A system 100 includes a mobile device 102 and a wireless smart card reader 104. Mobile device 102 and smart card reader 104 are able to communicate over a wireless communication link 106. A non-exhaustive list of examples of wireless local area network standards for wireless communication link 106 includes the Institute of Electrical and Electronic Engineers (IEEE) for Wireless LAN MAC and Physical layer (PHY) 802.11a, b, g and n specifications or future related standards, the Bluetooth® standard, the Zigbee™ standard and the like.

A smart card 108 is shown inserted into smart card reader 104. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 108 may use smart card reader 104 for identification and to digitally sign and/or decrypt messages sent by device 102.

For example, mobile device 102 may be able to send and receive e-mail messages via an e-mail server (not shown). If, for example, the Secure Multipurpose Internet Mail Extensions (S/MIME) protocol is used, e-mail messages received at mobile device 102 are encrypted using a symmetric algorithm with a random session key generated by the sender of the e-mail message. The e-mail message also includes the session key, encrypted using the public key of the recipient. Upon receipt of an encrypted e-mail message, mobile device 102 may extract the encrypted session key and send it to smart card reader 104 via communication link 106. Smart card reader 104 may send the encrypted session key to smart card 108, and the decryption engine of smart card 108 may decrypt the encrypted session key using the recipient's private decryption key, which is stored in smart card 108. Smart card reader 104 may retrieve the decrypted session key from smart card 108 and forward it to mobile device 102 via communication link 106 so that mobile device 102 can decrypt the received e-mail message. The smart card 108 may prevent unauthorized use of the recipient's private decryption key by requiring that a password or personal identification number (PIN) be supplied before allowing the decryption operation to proceed.

Similarly, to add a digital signature to an e-mail message being sent by mobile device 102, mobile device 102 may send a hash of the contents of the e-mail message to smart card reader 104 over communication link 106. Smart card reader 104 may pass the hash to smart card 108, which may produce a digital signature from the hash and the sender's private signing key, which is stored in smart card 108. Smart card 108 may then pass the digital signature to smart card reader 104, which may forward it to mobile device 102 via communication link 106 so that mobile device 102 can transmit it along with the e-mail message to the e-mail server. Again, smart card 108 may prevent unauthorized use of the recipient's private signing key by requiring that a password or PIN be supplied before allowing the signing operation to proceed.

The unencrypted session key should be sent securely over communication link 106 from smart card reader 104 to mobile device 102 to prevent a third party from retrieving the session key from communication link 106. Similarly, the hash to be signed should be sent authentically over communication link 106 from smart card reader 104 to mobile device 102 to prevent a third party from modifying the hash and thereby causing smart card 108 to produce a signature using a hash different from the hash of the intended message. Smart card reader 104 and mobile device 102 may each store a common, symmetric key and use a symmetric algorithm to secure communications over communication link 106. Alternatively, smart card reader 104 and mobile device 102 may store their own private keys and each other's public keys, and use an asymmetric algorithm combined with a symmetric algorithm to secure communications over communication link 106.

Figure 2:
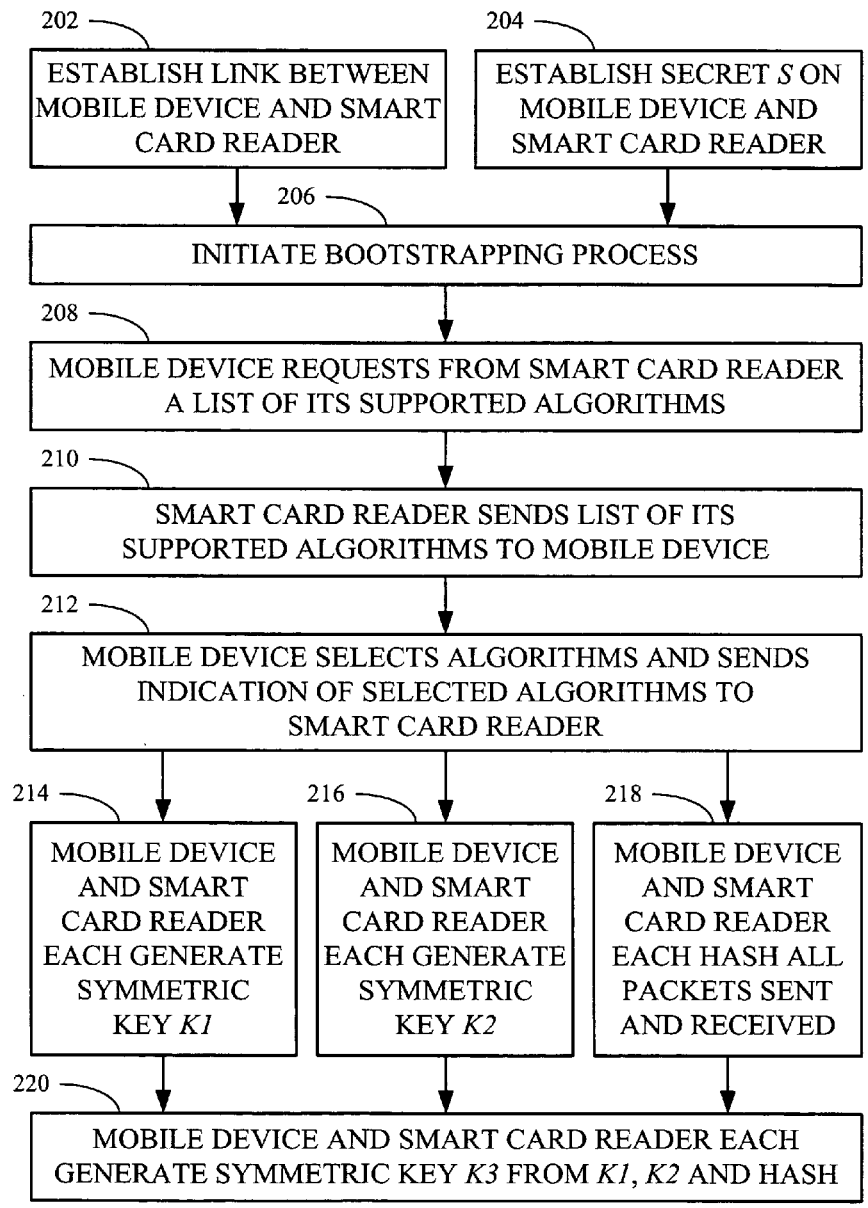
FIG. 2 is a flowchart of an exemplary method to be implemented by the devices in the system of FIG. 1.

In order to establish the symmetric key used to secure communications over communication link 106, mobile device 102 and smart card reader 104 may use the following method, as illustrated in the flowchart of FIG. 2, to which reference is additionally made.

At 202, a link between mobile device 102 and smart card reader 104 is established. This link may be, for example, wireless communication link 106.

At 204, a short secret S is established locally at mobile device 102 and smart card reader 104. Any method to establish the short secret S securely and authentically is suitable. By "locally", it is meant that the establishment of this secret does not require any involvement or intervention by an Information Technology (IT) administrator. Moreover, since the user of mobile device 102 and smart card reader 104 will perform the method of FIG. 2 on an as-needed basis, the establishment of the secret ought to be a simple procedure. An exemplary method to establish the short secret S using a display 110 is described hereinbelow with respect to FIG. 3.

Establishing the connection between mobile device 102 and smart card reader 104 may occur before, after or concurrently with establishing the short secret S locally on mobile device 102 and smart card reader 104.

Once the connection between mobile device 102 and smart card reader 104 has been established and the short secret S has been established locally on mobile device 102 and smart card reader 104, a "bootstrapping" process to generate a strong secret from the short secret S is initiated at 206. For example, the short secret S may originate at smart card reader 104, and once it has been shared with mobile device 102, mobile device 102 may initiate the bootstrapping process by sending an appropriate message (or just a packet) to smart card reader 104 over communication link 106.

The bootstrapping process involves at least one public key algorithm, at least one symmetric key algorithm, at least one hashing function, and any other security or non-security related information such as a compression algorithm. A non-exhaustive list of examples of public key algorithms includes Diffie-Hellman (DH) on a large prime-order finite group and DH on an elliptical curve (EC) group. At 208, mobile device 102 requests from smart card reader 104 a list of its supported algorithms. At 210, smart card reader 104 sends a list of its supported algorithms to mobile device 102.

At 212, mobile device 102 selects the algorithms to be used in the subsequent steps of the method and sends an indication of the selected algorithms to smart card reader 104. The selected algorithms include:
  a) one or two selected public key algorithms (e.g. the parameters or the name of the elliptic curve group, or the prime and generator of the large prime-order finite group);
  b) a selected symmetric key algorithm (e.g. Advanced Encryption Standard (AES) and the key size, or Triple Data Encryption Standard (DES), or the like); and
  c) a selected hash function (e.g., Message Digest 5 (MD5), Secure Hashing Algorithm 1 (SHA-1), SHA-256, or the like).

At 214, mobile device 102 and smart card reader 104 each generate the same symmetric key K1 from the short secret S, as described in further detail hereinbelow with respect to FIG. 4. At 216, mobile device 102 and smart card reader 104 each generate the same symmetric key K2, as described in further detail hereinbelow with respect to FIG. 5. Generating symmetric key K1 may occur before, after or concurrently with generating symmetric key K2.

At 218, mobile device 102 and smart card reader 104 each hash all the packets sent and received during the generation of symmetric keys K1 and K2 to produce the hash result H. For example, the selected hash function may be applied to the packets as the packets are sent and received, so that this is concurrent with generating the symmetric keys K1 and K2. In another example, the packets may be stored in a buffer and then the selected hash function may be applied to the packets after the symmetric keys K1 and K2 have been generated.

Once symmetric keys K1 and K2 have been generated, and mobile device 102 and smart card reader 104 have produced the hash result H, mobile device 102 and smart card reader 104 each generate the same symmetric key K3 from K1, K2 and the hash result H. For example, the selected hash function may be used to combine keys K1 and K2 and the hash result H into K3.

Symmetric key K3 may then be used to secure communications over communication link 106.

Figure 3:
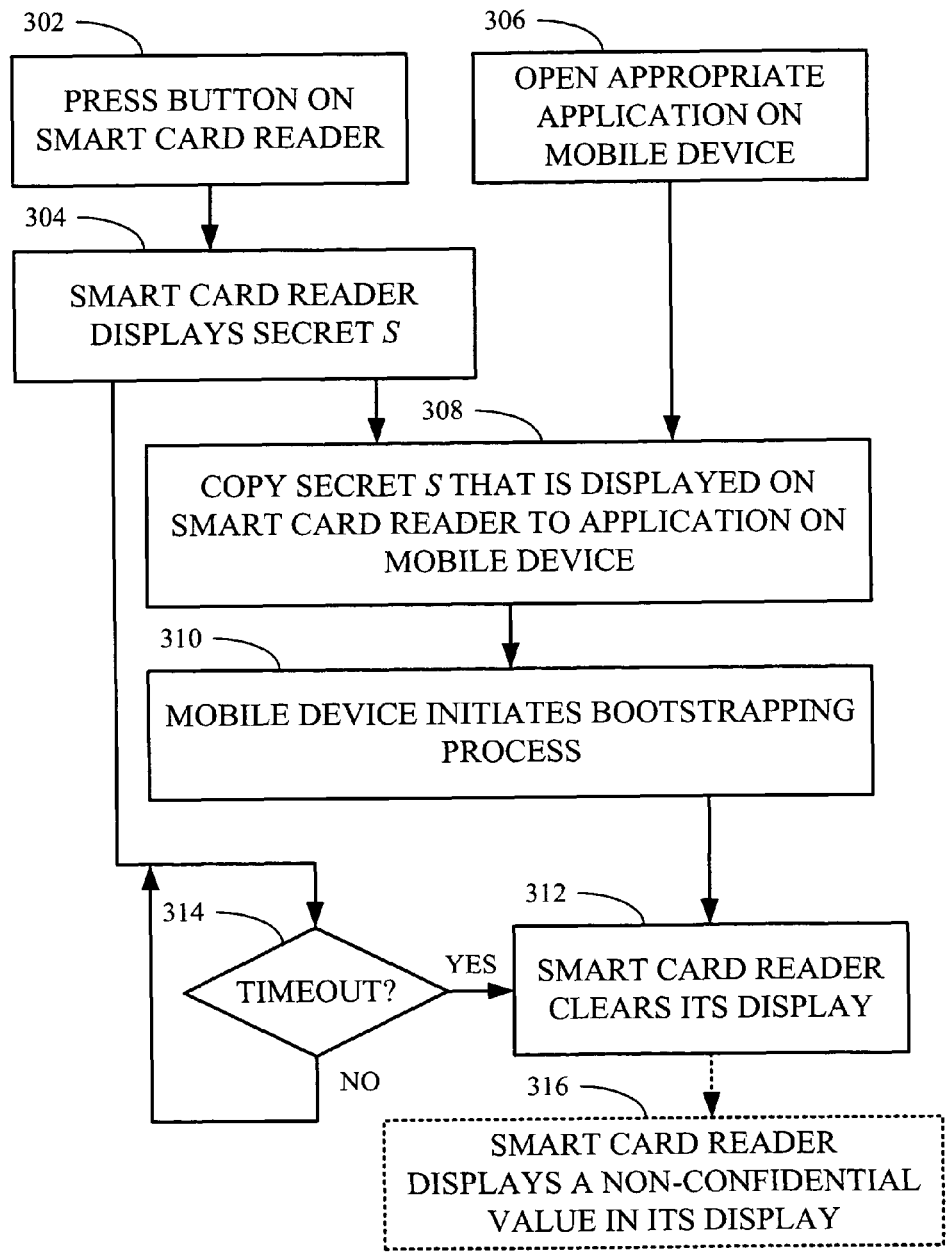
FIG. 3 is a flowchart of an exemplary method for establishing a secret between two devices.

Reference is now made to FIG. 3, which is a flowchart of an exemplary method for establishing a secret between two devices, according to some embodiments of the invention. At 302, a user may press a button 112 (FIG. 1) or other suitable input component of smart card reader 104, which will cause the short secret S, for example, "15379258", to be shown on display 110 of smart card reader 104 at 304. At 306, a user may open an appropriate application on mobile device 102. Causing the short secret S to be shown on display 110 may occur before, after or concurrently with opening the appropriate application on mobile device 102.

Once the short secret S has been shown on display 110 and the appropriate application has been opened on mobile device 102, the user may copy the short secret S to the application on mobile device 102 at 308 using an input component of mobile device 102, for example a keyboard 114. As illustrated in FIG. 1, the user has entered the first 3 digits of the 8-digit passphrase that is the short secret S. Although this example uses a numerical value for short secret S, any type of value may be used providing the value can be shown in display 110 and inputted using the input component of mobile device 102. Since the short secret S is short, it is simple for the user to copy the secret to the application on mobile device 102. However, the short secret S is too short to be suitable for use as a reliable symmetric key. Copying the short secret S to the application on mobile device 102 may result in mobile device 102 initiating the bootstrapping process (an example of block 206 of FIG. 2) at 310, for example, by sending an appropriate message (or just a packet) to smart card reader 104 over communication link 106.

To protect the short secret S from prying eyes, at 312, smart card reader 104 may clear display 110 once smart card reader 104 receives the message or packet sent by mobile device 102 to initiate the bootstrapping process.

Smart card reader 104 may also implement a timeout, and if, as checked at 314, the message or packet initiating the bootstrapping process has not been received by smart card reader 104 within the predefined period of time, which may be calculated, for example, from the time that the secret S is first shown on display 110, smart card reader 104 may clear display 110.

Once smart card reader 104 has cleared display 110, smart card reader 104 may optionally show a non-confidential (possibly random) value on display 110 so that a snooper looking at display 110 will not know whether the value on display 110 is the secret or not.

Figure 4:
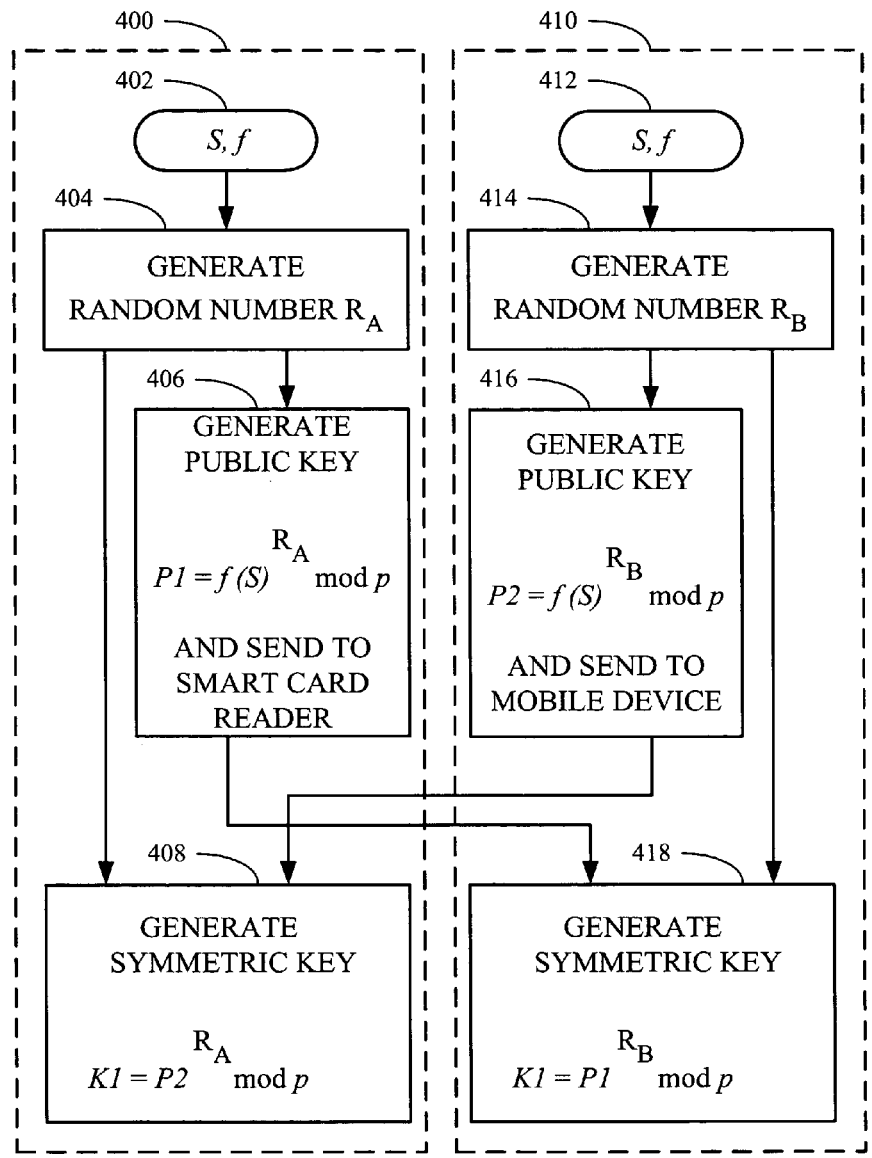
FIG. 4 is a flowchart of an exemplary method for generating a symmetric key from a secret.

Reference is now made to FIG. 4, which is a flowchart of an exemplary method for generating symmetric key K1 from the short secret S. The method of FIG. 4 is based on the simplified password-based exponential key exchange (SPEKE) method described in U.S. Pat. No. 6,226,383 to Jablon. All variations of the SPEKE method are suitable for generating symmetric key K1 from the short secret S.

The method includes a portion 400 to be implemented by mobile device 102 and a portion 410 to be implemented by smart card reader 104. At 402, mobile device 102 has possession of the secret S and one of the selected public key algorithms. For example, if the selected public key algorithm for generating symmetric key K1 is DH on a large prime-order finite group for a particular prime p, the function f when applied to the secret S, results in a generator of the group. U.S. Pat. No. 6,226,383 discusses factors to consider when selecting function f. Similarly, at 412, smart card reader 104 has possession of the secret S and the selected public key algorithm for generating symmetric key K1.

At 404, mobile device 102 generates a random number $R_A$ in the range of 2 to p−1. Then at 406, mobile device 102 generates a short-term public key $P_1$ by raising the generator f(S) to the power $R_A$ within the group and sends public key $P_1$ to smart card reader 104. In the example of DH on the large prime-order finite group for p, this is calculated as follows:

$$P_1 = f(S)^{R_A} \bmod p$$

Similarly, at 414, smart card reader 104 generates a random number $R_B$ in the range of 2 to p−1. Then at 416, smart card reader 104 generates a short-term public key $P_2$ by raising the generator f(S) to the power $R_B$ within the group and sends public key $P_2$ to mobile device 102. In the example of DH on the large prime-order finite group for p, this is calculated as follows:

$$P_2 = f(S)^{R_B} \bmod p$$

Generating the random number $R_B$ at smart card reader 104 and generating public key $P_2$ and sending it to mobile device 102 may occur before, after or concurrently with generating the random number $R_A$ at mobile device 102 and generating public key $P_1$ and sending it to smart card reader 104.

Once mobile device 102 has generated the random number $R_A$ and has received public key $P_2$, mobile device 102 generates a symmetric key K1 at 408. In the example of DH on the large prime-order finite group for p, the symmetric key K1 is calculated as follows:

$$K1 = P_2^{R_A} \bmod p = f(S)^{R_B R_A} \bmod p$$

Once smart card reader 104 has generated the random number $R_B$ and has received public key $P_1$, smart card reader 104 generates the symmetric key K1 at 418. In the example of DH on the large prime-order finite group for p, the symmetric key K1 is calculated as follows:

$$K1 = P_1^{R_B} \bmod p = f(S)^{R_A R_B} \bmod p$$

Since the operations on the elements of the group are commutative, the two calculations (at mobile device 102 and smart card reader 104) yield the same symmetric key. Generating the symmetric key K1 at mobile device 102 may occur before, after or concurrently with generating the symmetric key K1 at smart card reader 104.

Figure 5:
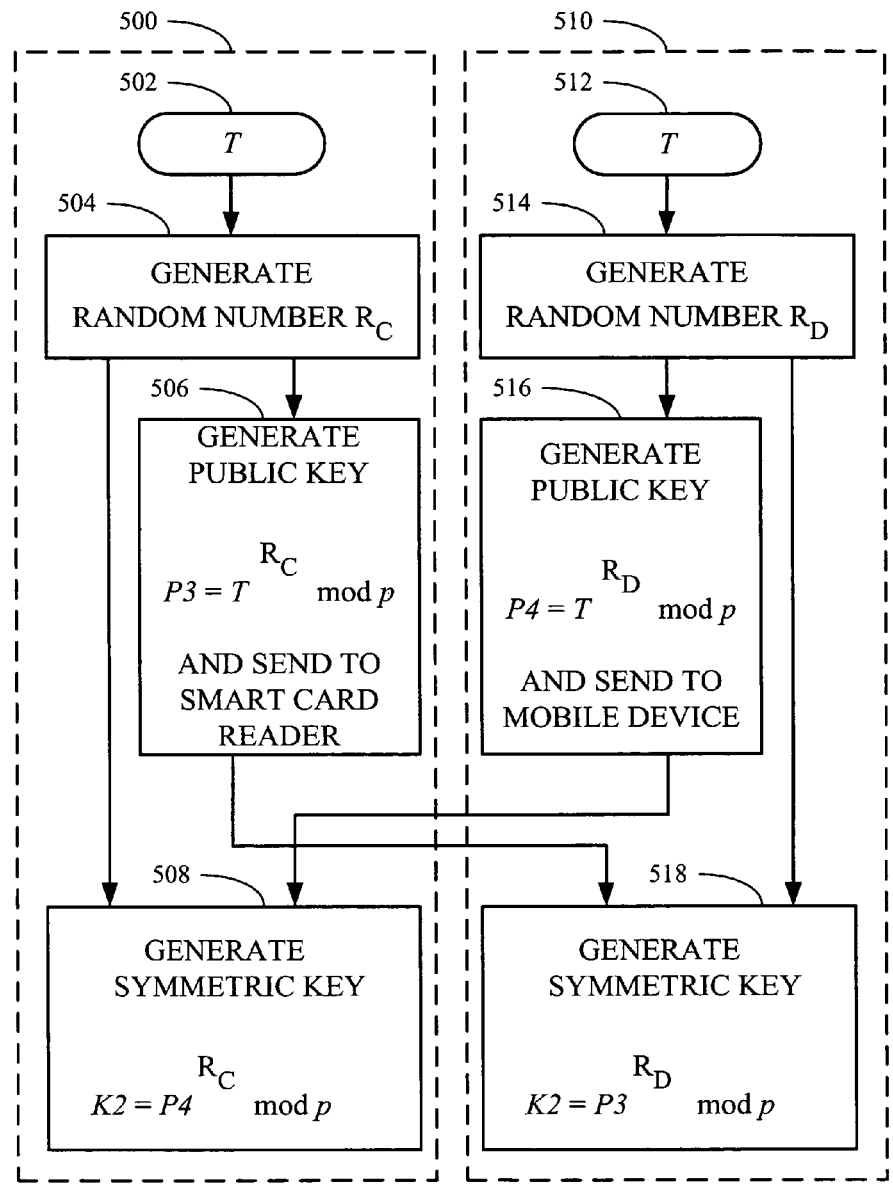
FIG. 5 is a flowchart of an exemplary method for generating a symmetric key.

Reference is now made to FIG. 5, which is a flowchart of an exemplary method for generating symmetric key K2. The method of FIG. 5 is based on well-known Diffie-Hellman exponential key exchange techniques.

The method includes a portion 500 to be implemented by mobile device 102 and a portion 510 to be implemented by smart card reader 104. At 502, mobile device 102 has possession of one of the selected public key algorithms, which may be the same as or different from the selected public key algorithm used to generate symmetric key K1. For example, if the selected public key algorithm for generating symmetric key K2 is DH on a large prime-order finite group for a particular prime p, mobile device 102 has possession of a known, published generator T of the group. Similarly, at 512, smart card reader 104 has possession of the selected public key algorithm for generating symmetric key K2.

At 504, mobile device 102 generates a random number RC in the range of 2 to p−1. Then at 506, mobile device 102 generates a short-term public key P3 by raising the generator T to the power $R_C$ within the group and sends public key P3 to smart card reader 104. In the example of DH on the large prime-order finite group for p, this is calculated as follows:

$$P3 = T^{R_C} \bmod p$$

Similarly, at 514, smart card reader 104 generates a random number RD in the range of 2 to p−1. Then at 516, smart card reader 104 generates a short-term public key P4 by raising the generator T to the power $R_D$ within the group and sends public key P4 to mobile device 102. In the example of DH on the large prime-order finite group for p, this is calculated as follows:

$$P4 = T^{R_D} \bmod p$$

Generating the random number $R_D$ at smart card reader 104 and generating public key P4 and sending it to mobile device 102 may occur before, after or concurrently with generating the random number $R_C$ at mobile device 102 and generating public key P3 and sending it to smart card reader 104.

Once mobile device 102 has generated the random number $R_C$ and has received public key P4, mobile device 102 generates a symmetric key K2 at 508. In the example of DH on the large prime-order finite group for p, the symmetric key K2 is calculated as follows:

$$K2 = P4^{R_C} \bmod p = T^{R_D R_C} \bmod p$$

Once smart card reader 104 has generated the random number $R_D$ and has received public key P3, smart card reader 104 generates the symmetric key K2 at 518. In the example of DH on the large prime-order finite group for p, the symmetric key K2 is calculated as follows:

$$K2 = P3^{R_D} \bmod p = T^{R_C R_D} \bmod p$$

Since the operations on the elements of the group are commutative, the two calculations (at mobile device 102 and smart card reader 104) yield the same symmetric key. Generating the symmetric key K2 at mobile device 102 may occur before, after or concurrently with generating the symmetric key K2 at smart card reader 104.

Figure 6:
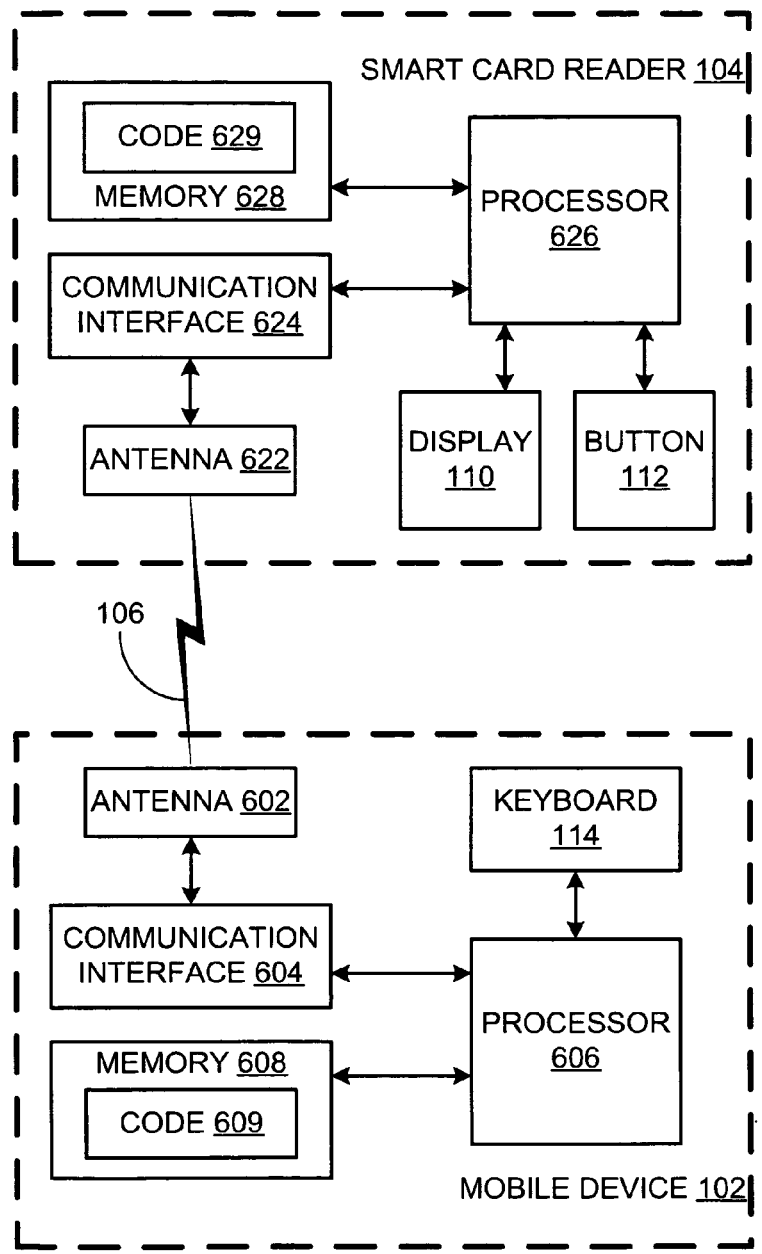
FIG. 6 is a block diagram of the exemplary system of FIG. 1.

FIG. 6 is a block diagram of system 100, according to some embodiments of the invention. For clarity, some components of mobile device 102 and smart card reader 104 are not shown in FIG. 6 and are not described explicitly below.

Mobile device 102 includes an antenna 602 and smart card reader 104 includes an antenna 622. A non-exhaustive list of examples for antennae 602 and 622 includes dipole antennae, monopole antennae, multilayer ceramic antennae, planar inverted-F antennae, loop antennae, shot antennae, dual antennae, omnidirectionale antenna and any other suitable antennae.

Mobile device 102 also includes a communication interface 604 coupled to antenna 602. Smart card reader 104 includes a communication interface 624 coupled to antenna 604. A non-exhaustive list of examples for standards with which communication interfaces 604 and 624 may be compatible includes 802.11a, b, g and n and future related standards, the Bluetooth® standard, the Zigbee™ standard and the like.

Mobile device 102 also includes a processor 606 coupled to communication interface 604 and to keyboard 114. Mobile device 102 also includes a memory 608, which may be fixed in or removable from mobile device 102. Memory 608 may be coupled to processor 606 or partly embedded in processor 606. Communication interface 604 and processor 606 may be part of the same integrated circuit or in separate integrated circuits. Similarly, processor 606 and memory 608 may be part of the same integrated circuit or in separate integrated circuits.

Smart card reader 104 also includes a processor 626 coupled to communication interface 624, to display 110 and to button 112. Smart card reader 104 also includes a memory 628, which may be fixed in or removable from smart card reader 104. Memory 628 may be coupled to processor 626 or partly embedded in processor 626. Communication interface 624 and processor 626 may be part of the same integrated circuit or in separate integrated circuits. Similarly, processor 626 and memory 628 may be part of the same integrated circuit or in separate integrated circuits.

A non-exhaustive list of examples for processors 606 and 626 includes a central processing unit (CPU), a digital signal processor (DSP), a reduced instruction set computer (RISC), a complex instruction set computer (CISC) and the like. Furthermore, processors 606 and 626 may be part of an application specific integrated circuit (ASIC) or may be a part of an application specific standard product (ASSP).

A non-exhaustive list of examples for memories 606 and 626 includes any combination of the following:
a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
b) optical devices, such as compact disk read only memory (CD ROM), and the like; and
c) magnetic devices, such as a hard disk, a floppy disk, a magnetic tape, and the like.

Memory 608 may store executable code 609 which, when executed by processor 606, may cause mobile device 102 to implement relevant portions of any or a combination of the methods of FIGS. 2, 3, 4 and 5.

Memory 628 may store executable code 629 which, when executed by processor 626, may cause smart card reader 104 to implement relevant portions of any or a combination of the methods of FIGS. 2, 3, 4 and 5.

The preceding explanation uses the example of mobile device 102, smart card reader 104 and wireless communication link 106. However, embodiments of the invention are equally applicable to any two devices (not necessary mobile devices) where the security and/or authenticity of the communication link (not necessarily wireless) between the two devices are possibly unsatisfactory.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for securing a communication link between a first device and a second device, the method comprising:
generating a first cryptographic key;
generating a second cryptographic key;
hashing packets communicated between said first device and said second device over said communication link to create a hash result; and
hashing said first cryptographic key, said second cryptographic key and said hash result to generate a third cryptographic key to be used to secure said communication link.

2. The method of claim 1, wherein said packets were communicated over said communication link during generation of said first cryptographic key and during generation of said second cryptographic key.

3. The method of claim 1, wherein generating said first cryptographic key includes an exchange of public keys between said first device and said second device over said communication link, said public keys based on a secret shared by said first device and said second device.

4. The method of claim 1, wherein generating said second cryptographic key includes an exchange of public keys between said first device and said second device over said communication link.

5. The method of claim 1, wherein generating said first cryptographic key includes:
applying a function to a secret to obtain a generator element of a mathematical group;
raising said generator element to a first random number to obtain another element of said group;
sending said other element over said communication link;
receiving over said communication link a further element of said group, said further element having been created by raising said generator element to a second random number; and
raising said further element to said first random number to obtain said first cryptographic key.

6. The method of claim 1, wherein generating said second cryptographic key includes:
raising a known generator element of a mathematical group to a first random number to obtain another element of said group;
sending said other element over said communication link;
receiving over said communication link a further element of said group, said further element having been created by raising said known generator element to a second random number; and
raising said further element to said first random number to obtain said second cryptographic key.

7. A first device comprising:
a communication interface through which said first device is able to establish a communication link with a second device;
a processor; and
a memory able to store executable code which, when executed by said processor, generates a first cryptographic key, generates a second cryptographic key, hashes packets communicated between said first device and said second device over said communication link to create a hash result, and hashes said first cryptographic key, said second cryptographic key and said hash result to generate a third cryptographic key.

8. The first device of claim 7, wherein said packets were communicated over said communication link during generation of said first cryptographic key and during generation of said second cryptographic key.

9. A system comprising:
a first device and a second device able to communicate over a communication link, wherein said first device is to generate a cryptographic key from a first cryptographic key, a second cryptographic key and a hash result created by hashing packets communicated between said first device and said second device over said communication link, and wherein said second device is to generate said cryptographic key from said first cryptographic key, said second cryptographic key and said hash result.

10. The system of claim 9, wherein said first device and said second device are to share a secret and said first cryptographic key is based upon said secret.

11. The system of claim 9, wherein said first device and said second device are to generate said first cryptographic key from an exchange of public keys over said communication link.

12. The system of claim 9, wherein said first device and said second device are to generate said second cryptographic key from an exchange of public keys over said communication link.

* * * * *